United States Patent [19]

Clark

[11] Patent Number: 5,257,577
[45] Date of Patent: Nov. 2, 1993

[54] APPARATUS FOR ASSIST IN RECYCLING OF REFUSE

[76] Inventor: Melvin D. Clark, Box 2254, West Unity, Ohio 43570

[21] Appl. No.: 902,836

[22] Filed: Jun. 23, 1992

Related U.S. Application Data

[63] Continuation-in-part of Ser. No. 678,740, Apr. 1, 1991, abandoned.

[51] Int. Cl.⁵ .............................................. B30B 15/00
[52] U.S. Cl. ........................................ 100/99; 100/215;
100/221; 100/223; 100/229 A; 141/83;
141/248; 209/655; 209/706; 209/930; 220/909;
232/43.2; 232/44
[58] Field of Search ................... 100/70 R, 73, 91, 99,
100/215, 221-225, 229 A; 4/629; 141/83, 94,
248; 193/14, 23, 33, 34; 209/546, 655, 706, 930;
220/529-531, 909; 232/43.1, 43.2, 43.5, 44

[56] References Cited

U.S. PATENT DOCUMENTS

| | | | |
|---|---|---|---|
| 3,176,840 | 4/1965 | Bickel | 209/655 X |
| 3,768,398 | 10/1973 | Ullman, Jr. | 100/73 X |
| 4,241,652 | 12/1980 | Smedlund | 100/223 X |
| 4,248,389 | 2/1981 | Thompson et al. | 100/91 X |
| 4,532,859 | 8/1985 | Solordal | 100/99 X |
| 4,559,981 | 12/1985 | Hirano | 141/83 |
| 4,719,851 | 1/1988 | Chesnut | 100/73 X |
| 4,781,111 | 11/1988 | Chesnut | 100/99 |
| 4,847,927 | 7/1989 | Blanc | 4/629 |
| 5,031,829 | 7/1991 | Shantzis | 209/706 X |

FOREIGN PATENT DOCUMENTS

| | | | |
|---|---|---|---|
| 3011527 | 10/1981 | Fed. Rep. of Germany | 209/930 |
| 81/02802 | 10/1981 | PCT Int'l Appl. | 100/215 |
| 90/08714 | 8/1990 | PCT Int'l Appl. | 220/909 |
| 388182 | 9/1976 | Sweden | 209/655 |
| 1201391 | 8/1970 | United Kingdom | 100/215 |

*Primary Examiner*—Stephen F. Gerrity
*Attorney, Agent, or Firm*—Ogram & Teplitz

[57] ABSTRACT

An apparatus which collects recyclable refuse in sorted compartments. Through either automatic sensors or through an operator panel, the apparatus determines the contents of the refuse and directs it to the proper compartment or container. In this manner, recyclable material such as aluminum cans, glass bottles, plastics, etc. are easily sorted to encourage the recycling of this material. Further, periodically, the refuse within the compartments are compacted and disinfected to reduce handling requirements and odors.

7 Claims, 3 Drawing Sheets

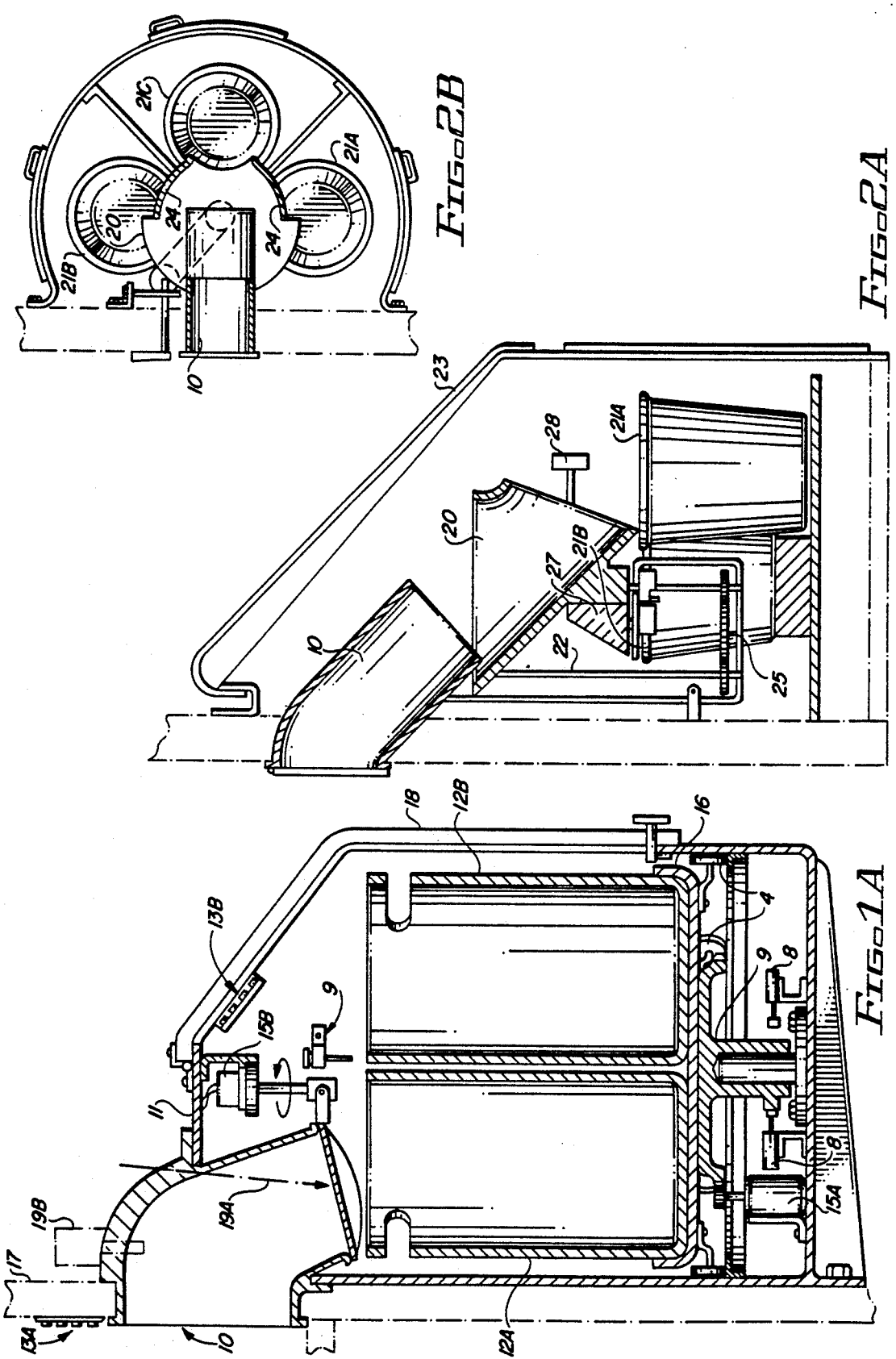

APPARATUS FOR ASSIST IN RECYCLING OF REFUSE

This is a continuation-in-part of U.S. patent application, Ser. No. 07/678,740, entitled "An Apparatus to Assist in Recycling of Refuse", filed Apr. 1, 1991 (now abandoned).

This invention relates generally to recycling of materials and more particularly to apparatus which assist in the collection and sorting of recyclable refuse.

For almost all of recorded history, Man has taken the view that it was impossible to exhaust the resources of Earth. More modernly, an awareness that the resources of Earth are limited has begun to be realized and appreciated.

With this awareness has come a sense that, where possible, resources should not be squandered, but should be recycled so that fresh resources need not be exploited as fully. Recycling, although technically very simple, presents a variety of practical problems which society must address.

Generally, society desires to behave in a socially conscientious manner; but, individually, this manner must not require too much effort or the individual tends to "take the easy way" and not recycle.

One of the major inconveniences associated with recycling is the vast array of recyclable refuse and the various containers which must be available to the user at the time when refuse is being discarded.

As example, as the consumer finishes their lunch, recycling of the aluminum beverage can is desirable; but, if a container for separating aluminum cans is not readily available, the consumer generally discards the aluminum can with the papers. These end up in the landfill. The same situation occurs with glass bottles, plastic bottles and containers, and a variety of other materials which can be recycled.

The collection container must be close; but, there must also be a variety of collection containers to address the wide variety of recyclable goods.

Individual containers take up too much room and become inconvenient. To remedy the availability and size problems, a variety of patents have attempted to produce refuse containers (trash cans) with multiple compartments so that the user is presented with easy access for the collection of recyclables.

Some such patents are: U.S. Pat. No. 3,904,218, entitled "Complementary Trash Can Unit" issued to Kostic on Sep. 9, 1975; U.S. Pat. No. 3,720,346 entitled "Compartmented Trash Receptacle" issued to Cypher on Mar. 13, 1973; U.S. Pat. No. 4,905,853, entitled "Compartmented Receptacle" issued to Strawder on Mar. 6, 1990; and, U.S. Pat. No. 4,834,262, entitled "Trash Separation Container" issued to Reed on May 30, 1989.

In all of these situations though, a rudimentary arrangement of compartmentalized cans is presented to the consumer who must find the proper opening. In essence, separate containers are merely collected into a single housing; there still are separate openings and the devices are bulky and consumes floor space.

It is clear from the foregoing, that advances in the collection of recyclable materials is important.

SUMMARY OF THE INVENTION

In the present invention, an apparatus which collects recyclable refuse in sorted compartments uses either automatic sensors or an operator panel, to determine the contents of the refuse. This refuse is directed to the proper compartment or container. In this manner, recyclable material such as aluminum cans, glass bottles, plastics, etc. are easily sorted to encourage the recycling of this material.

To provide for a more efficient use of space and equipment, a single chute is utilized. With the single chute comes the requirement that the containers or compartments are moved to the chute based upon the type of refuse being used. The single chute permits easy and aesthetically pleasing installation of the apparatus.

Within this invention, there are provided, a multiplicity of containers for containment of recylable refuse such as aluminum cans, glass bottles, plastics, and newspapers. These containers are each addressed by a single refuse chute; for a particular container to be addressed, either the refuse chute is moved appropriately or the container is moved to accept refuse from the refuse chute.

Periodically, the refuse within the compartments are compacted and disinfected to reduce handling requirments and odors. A wide variety of compaction means are suitable for this application. Those of ordinary skill in the art readily recognize various arrangements of devices which accomplish this task within the invention. U.S. Pat. No. 3,531,909, entitled "Compacting Means for the Containers of Trash Receptacles" issued to Edebalk on Oct. 6, 1970, incorporated hereinto by reference, describes one such compactor which is suitable for this application.

Selection of the proper container is done in one of two ways: the user specifies which type of material is being discarded; or, the system determines the type of material automatically.

In the first situation, operator selection is accomplished by an operator control panel which either electrically or manually adjusts the refuse chute to the correct container. As example, if the operator control panel is electrical, the user specifies the type of refuse, say aluminum, by pressing the button marked "Al Cans"; whereupon, a motor adjusts the refuse chute to the proper container so that refuse placed within the refuse chute enters the appropriate container (the one for aluminum cans).

Ideally the control panel includes a microprocessor or computer such as an 80286 computer commercially available from Intel Corporation. Those of ordinary skill in the art readily recognize other microprocessors and controllers which are capable of serving the functions outlined here. The microprocessor permits ongoing control and monitoring of the device.

Those of ordinary skill in the art readily recognize a wide variety of devices and systems which can determine the relative position of the containers and the chute, and which can "advise" the control panel. Such techniques include, but are not limited to: strategically placed switches which are appropriately tripped; identifying holes in the platform which are read using lights and light sensors; and, mechanical notches forming a "fingerprint" of the position of the platform.

The electrical control panel also permits lights to be used to indicate when a container is filled to capacity. This feature minimizes the possibility of overfilling a container which may jam the mechanism.

Through the use of a variety of distance measuring devices employing audio/sonic waves, the distance from the sensor to the "top" of the recycled material in the container is established. This distance is compared to a "filled level" value for determination of when the container is filled. Once a "filled" state is achieved, the sensor communicates an electrical signal to the electrical control panel to so advise the user.

The manual operator control panel permits the user to rotate a handle to point to the proper label; rotation of the handle mechanically positions the container relative to the refuse chute. In the preferred embodiment, the mechanical positioning of the container is through a rotating action.

Those of ordinary skill in the art recognize various devices which utilize sonics, light waves, and the like to determine what type of material is being disposed. In another embodiment of this invention, these devices are utilized to identify the refuse being held in the refuse chute, and once so identified, positioning of the container and permitting the refuse to fall into the proper container.

Although several embodiments of the invention are possible, the preferred embodiment places the housing and the containers exterior to the dwelling. This placement of the containers reduces the odor which may buildup, provides for more room for the apparatus, and also permits easy withdrawal by the recycling company.

An alternative embodiment of the invention places the apparatus in an under-the-counter arrangement. This embodiment is ideal for apartments, offices, and the like where the exterior model is infeasible.

A feature of the invention is the ability to periodically compact the refuse within the containers. This lengthens the cycle time between collection and disposal of the refuse, and also permits smaller containers to be utilized.

To eliminate odor buildup and transmission as much as possible, preferably seals are used on the door which closes the refuse chute and periodically a disinfectant is sprayed into the containers.

The invention, together with various embodiments thereof, will be more fully described by the following drawings and their accompanying descriptions.

DRAWING IN BRIEF

FIGS. 1A and 1B illustrate a side and top view respectively of the preferred embodiment of the invention in which an electrical motor is used to position the containers.

FIGS. 2A and 2B illustrate a side and top view respectively of an alternative embodiment of the invention in which manual manipulation of the chute is utilized.

DRAWINGS IN DETAIL

Figure 1B:
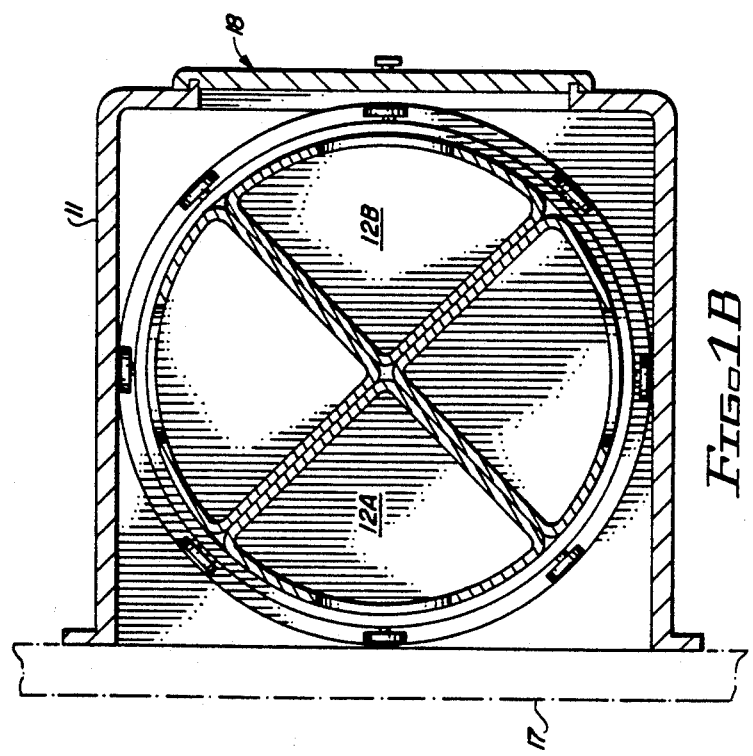

FIGS. 1A and 1B illustrate a side and top view respectively of the preferred embodiment of the invention in which an electrical motor is used to position the containers and a refuse chute is used as a receptacle.

In alterative embodiments of the invention, other receptacles are used such as manually operable trays or drawers which are moved into the dump position. Those of ordinary skill in the art readily recognize various other mechanisms which can be used in this context.

Containers 12A and 12B are positioned beneath refuse chute 10. Through the use of motor 15A, transfer face 9 and switches 8, platform 16 is selectively rotated and positioned. Platform 16 rests on rollers 14 which provide support.

A deposit door 19A is automatically opened an closed by index motor 15B after the selected container has indexed under the refuse chute 10. This allows refuse to be deposited in refuse chute 10 and the desired container switch on control panel 13A activated by the operator. The operator is then able to leave and refuse is automatically deposited in the proper container.

An alterative embodiment of the automatic deposit door 19A is a door or stopper that is manually opened and closed across refuse chute 10. This requires the operator to activate the desired container switch on control panel 13A and wait until the container has indexed under refuse chute 10; then the operator must manually open refuse chute 10 and deposit the refuse. This alternative embodiment simplifies the deposit mechanism but requires more operator time to deposit refuse.

Door 18 on housing 11 is used to collect and withdraw the containers once they are filled. The service control panel 13B is used to index the container selected for removal and service, to the service door 18.

Although this embodiment uses a deposit control panel 13A, an alterative embodiment utilizes a sensor 19B in conjunction with deposit door 19A. Refuse of one kind is placed in chute 10 and held in place by deposit door 19A. Sensor 19B identifies the type of refuse contained and directs motor 15A appropriately (i.e. to move the proper container beneath chute 10). Once this is accomplished, deposit door 19A opens and permits the refuse to fall into the appropriate container. In this manner, the user merely places refuse of a particular kind (e.g. aluminum cans) into chute 10 and leaves the apparatus to automatically deposit the refuse in the appropriate container.

Sensor 9 illuminates a lamp on control panel 13A when any container is full. Sensor 9, in the preferred embodiment, uses a sonic signal to determine if the container is full. If full, an electrical signal, not shown, is communicated to control panel 13A.

FIGS. 2A and 2B illustrate a side and top view respectively of an alternative embodiment of the invention in which manual manipulation of the chute is utilized.

Again, refuse is placed in refuse chute 10; in this embodiment though, the refuse falls into directing chute 20 which is pivotable to address one of the three containers 21A, 21B, or 21C. Collars 24 on directing chute 20 prevent the refuse from escaping and causing the mechanism to jam.

Although movement of the directing chute 20 may be accomplished by an electrical motor, in this example, a manual movement is accomplished. Through rotation of driving rod 22 (explained in detail in FIG. 3), chain 25 is moved, which causes directing chute 20 to rotate to the correct position.

Periodically, the refuse within the compartments are compacted and disinfected via mechanism 27 to reduce handling requirements and odors.

Sonic sensor 28 is used to gauge the level of each container and communicate the same to the control panel, not shown.

Figure 3:
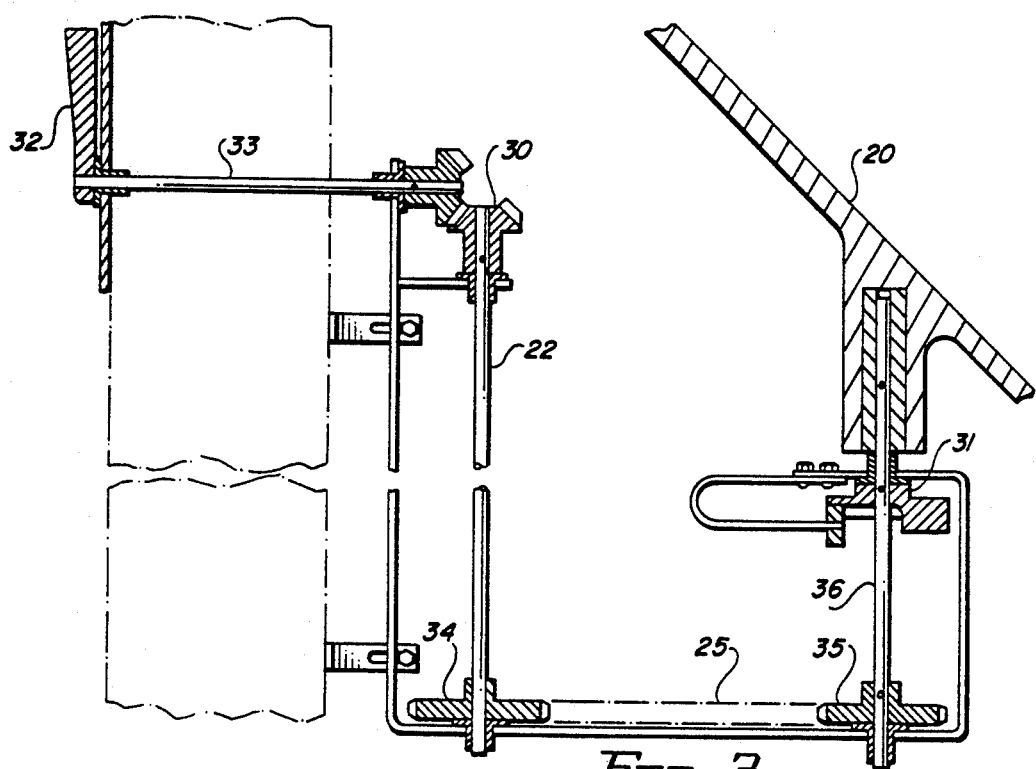
FIG. 3 is a closeup view of the manual mechanism utilized in FIGS. 2A and 2B.

FIG. 3 is a closeup view of the manual mechanism utilized in FIGS. 2A and 2B.

User rotation of handle 32 causes shaft 33 to rotate. This rotation of shaft 33 is transferred to shaft 22 via bevel gears 30. At the end of shaft 22 is gear 34 which causes gear 35, attached to shaft 36, to rotate via roller chain 25. Shaft 36 is affixed to directing chute 20 so that as shaft 22 rotates, directing chute 20 also rotates.

In this manner, manual manipulation of handle 32 assures the user that the refuse is being deposited into the correct container.

Figure 4:
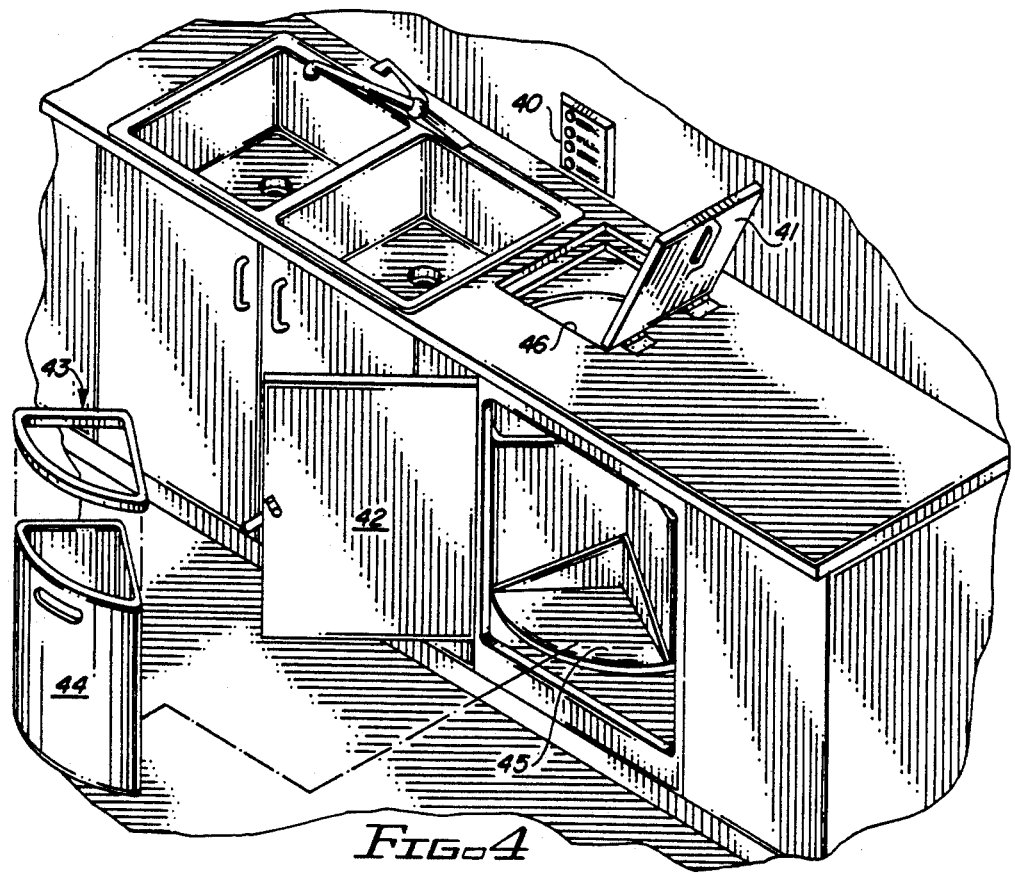
FIG. 4 is a perspective view of an under-the-counter embodiment of the invention.

FIG. 4 is a perspective view of an under-the-counter embodiment of the invention.

Access to the refuse chute, or simply the openings at the top of the containers, is via door 41. Door 41 is secured and sealed by magnetic seal 46 affixed around its frame to prevent odors from entering the dwelling. Those of ordinary skill in the art readily recognize various other mechanisms which will assist in sealing the apparatus.

Control panel 40 permits the user to select the proper category of refuse being disposed and have turntable 45 rotate, via an electric motor (not shown), to the proper location so that only the correct container is accessible through door 41.

To remove the refuse, door 42 is opened permitting container 44 to be removed. In this embodiment of the invention, plastic garbage bags are utilized in container 44 and a retainer ring 43 is used to secure the plastic garbage bag to container 44.

Figure 5:
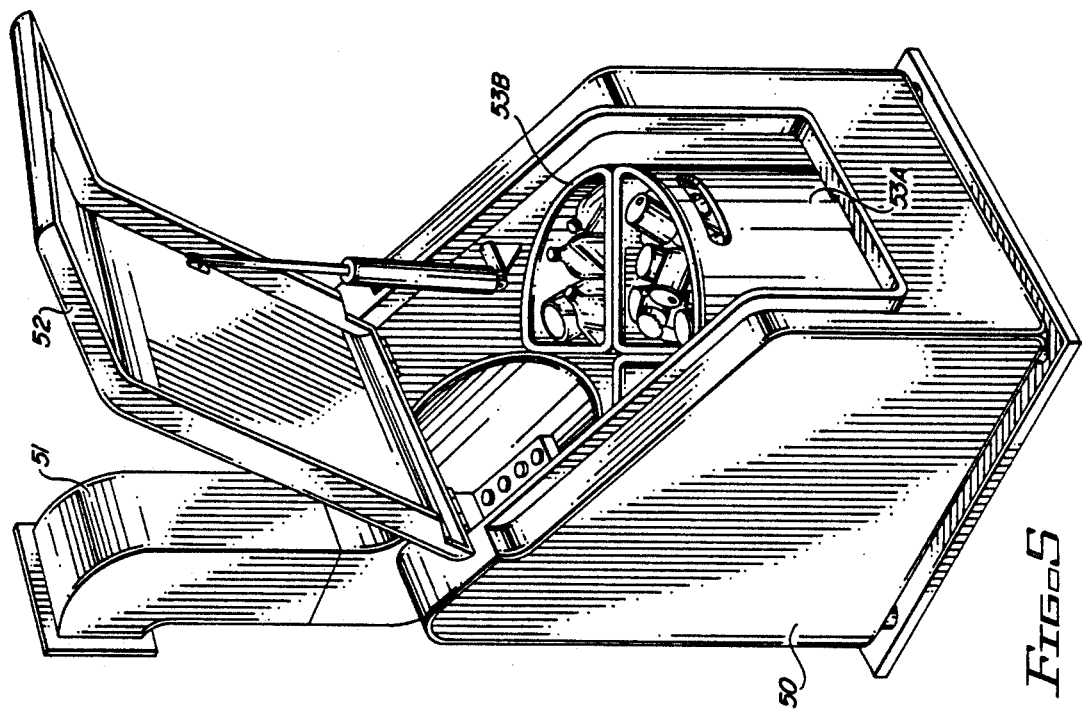
FIG. 5 is a perspective view of an exterior embodiment of the invention.

FIG. 5 is a perspective view of an exterior embodiment of the invention.

Chute 51 communicates the refuse to the exterior located apparatus 50. Containers 53A and 53B collect the differing refuse and are removed from the housing through the use of door 52.

It is clear that the present invention provides for an apparatus which greatly facilitates the sorting and collection of recyclable refuse.

What is claimed is:

1. An apparatus for the disposal of refuse comprising:
    a) a refuse chute for receipt of refuse having at least two categories;
    b) means for determining the category of refuse within said refuse chute using a sensor means for automatically identifying the category of said refuse;
    c) at least two compartments;
    d) direction means responsive to said means for determining, for directing said refuse from said refuse chute to a selected one of said compartments; and,
    e) means for compacting refuse within one of said at least two compartments; and,
    f) means for restraining refuse within said refuse chute until said means for determining has determined the category of refuse within said refuse chute.

2. The apparatus according to claim 1 further including an operator control panel having a positioning indicia visible to an operator indicating when said direction means is properly positioned.

3. The apparatus according to claim 2 further including a holder means for holding said at least two compartments and wherein said direction means includes a motor for positioning said at least two compartments via said means for holding relative to said refuse chute.

4. An apparatus to assist recycling of refuse comprising:
    a) an operator control panel for receiving operator input indicative of the type of refuse being disposed;
    b) a refuse chute for receipt of refuse;
    c) a housing having therein,
        1) at least two containers,
        2) holder means, being responsive to said operator control panel, for holding said at least two containers and for positioning a selected one of said containers to receive refuse from said refuse chute based upon said operator input,
        3) means for compacting refuse within one of said at least two containers, and
        4) means for restraining refuse within said refuse chute until said holder means has positioned the selected one of said containers.

5. The apparatus according to claim 4 wherein said operator control panel includes a positioning indicia of when said holder means has positioned the selected one of said compartments to receive refuse from said refuse chute.

6. The apparatus according to claim 5 wherein said housing is located exterior to an edifice, said operator control panel is located interior to said edifice, and said refuse chute extends from the interior to the exterior of said edifice, and wherein said housing further includes a door for removal of said at least two containers from said housing.

7. The apparatus according to claim 6 wherein said holder means includes a motor for positioning said at least two containers relative to said refuse chute.

* * * * *